United States Patent
Horiuchi et al.

(10) Patent No.: US 8,107,967 B2
(45) Date of Patent: Jan. 31, 2012

(54) RELAY STATION IN MOBILE COMMUNICATION SYSTEM AND RELAY TRANSMISSION CHANNEL SETTING METHOD

(75) Inventors: Ayako Horiuchi, Kanagawa (JP); Tomohiro Imai, Kanagawa (JP); Kenichi Kuri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 444 days.

(21) Appl. No.: 12/442,502

(22) PCT Filed: Oct. 2, 2007

(86) PCT No.: PCT/JP2007/069305
§ 371 (c)(1), (2), (4) Date: Mar. 23, 2009

(87) PCT Pub. No.: WO2008/044554
PCT Pub. Date: Apr. 17, 2008

(65) Prior Publication Data
US 2010/0029285 A1    Feb. 4, 2010

(30) Foreign Application Priority Data
Oct. 3, 2006 (JP) ................................. 2006-272131

(51) Int. Cl.
*H04W 72/00* (2009.01)
*H04B 3/36* (2006.01)
*H04B 7/14* (2006.01)
(52) U.S. Cl. .............................. 455/450; 455/7; 370/315
(58) Field of Classification Search .............. 455/7, 450, 455/445; 370/315
See application file for complete search history.

(56) References Cited

U.S. PATENT DOCUMENTS

| 4,829,540 | A  | * | 5/1989  | Waggener et al. | ............ | 375/133 |
| 2004/0184417 | A1 | * | 9/2004  | Chen et al. | ................... | 370/328 |
| 2005/0014464 | A1 | * | 1/2005  | Larsson | ....................... | 455/11.1 |
| 2005/0232183 | A1 | * | 10/2005 | Sartori et al. | ................. | 370/319 |

FOREIGN PATENT DOCUMENTS

| JP | 2002-271255 | 9/2002 |
| JP | 2002-271845 | 9/2002 |
| JP | 2005-142805 | 6/2005 |
| JP | 2006-025388 | 1/2006 |

OTHER PUBLICATIONS

International Search Report dated Jan. 22, 2008.

* cited by examiner

*Primary Examiner* — Erika Gary
*Assistant Examiner* — Michael Mapa
(74) *Attorney, Agent, or Firm* — Dickinson Wright PLLC

(57) ABSTRACT

Provided is a relay station capable of reducing control information required for allocating a relay transmission channel in a mobile communication system. The relay station (100) includes: a demodulation unit (103) and a decoding unit (104) for demodulating and decoding a signal from a mobile station and channel allocation information from a base station; an extraction unit (105) for extracting a signal from the mobile station from signals inputted from the decoding unit (104) so as to output it to a coding unit (107) and extracting channel allocation information from the base station so as to output it to a channel setting unit (106); the channel setting unit (106) for setting a channel transmission channel according to a channel allocation rule shared by the relay station (100) and the base station; the coding unit (107) and a modulation unit (108) for encoding and modulating the signal from the mobile station; and a channel allocation unit (109) for allocating the modulated signal to one of the relay transmission channels.

10 Claims, 22 Drawing Sheets

| CHANNEL 1: MOBILE STATION 1 | CHANNEL 2: MOBILE STATION 1 | CHANNEL 3: MOBILE STATION 2 | CHANNEL 4: MOBILE STATION 3 |
|---|---|---|---|

FIG.2A

| CHANNEL 1 | MOBILE STATION 1 → RELAY STATION |
|---|---|
| CHANNEL 2 | MOBILE STATION 1 → RELAY STATION |
| CHANNEL 3 | MOBILE STATION 2 → RELAY STATION |
| CHANNEL 4 | MOBILE STATION 3 → BASE STATION |

FIG.2B

CHANNEL 4:
RELAY STATION

FIG.9A

| CHANNEL 1 | RELAY STATION → BASE STATION |
| CHANNEL 2 | RELAY STATION → BASE STATION |
| CHANNEL 3 | RELAY STATION → BASE STATION |
| CHANNEL 4 | RELAY STATION → BASE STATION |

FIG.9B

| CHANNEL 1: | CHANNEL 2: | CHANNEL 3: | CHANNEL 4: |
|---|---|---|---|
| MOBILE STATION 1 | MOBILE STATION 4 | MOBILE STATION 2 | MOBILE STATION 3 |

FIG.12A

| | |
|---|---|
| CHANNEL 1 | MOBILE STATION 1 → RELAY STATION |
| CHANNEL 2 | MOBILE STATION 4 → BASE STATION |
| CHANNEL 3 | MOBILE STATION 2 → RELAY STATION |
| CHANNEL 4 | MOBILE STATION 3 → BASE STATION |

FIG.12B

| | |
|---|---|
| CHANNEL 1 | MOBILE STATION 1 → RELAY STATION |
| CHANNEL 2 | MOBILE STATION 4 → RELAY STATION |
| CHANNEL 3 | MOBILE STATION 2 → RELAY STATION |
| CHANNEL 4 | MOBILE STATION 3 → BASE STATION |

FIG.12C

CHANNEL 4:
MOBILE STATION 5

| MOBILE STATION 1: (1,2,3) | MOBILE STATION 3: (2,2,2) | MOBILE STATION 5: (6,1,1) | MOBILE STATION 2: (9,2,2) | MOBILE STATION 4: (10,2,2) |
|---|---|---|---|---|

FIG.14A

| | |
|---|---|
| CHANNEL 1 | MOBILE STATION 1 → RELAY STATION |
| CHANNEL 2 | MOBILE STATION 3 → BASE STATION |
| CHANNEL 3 | MOBILE STATION 1 → RELAY STATION |
| CHANNEL 4 | MOBILE STATION 3 → BASE STATION |
| CHANNEL 5 | MOBILE STATION 1 → RELAY STATION |
| CHANNEL 6 | MOBILE STATION 5 → BASE STATION |
| CHANNEL 7 | MOBILE STATION 5 → BASE STATION |
| CHANNEL 8 | MOBILE STATION 5 → BASE STATION |
| CHANNEL 9 | MOBILE STATION 2 → RELAY STATION |
| CHANNEL 10 | MOBILE STATION 4 → BASE STATION |
| CHANNEL 11 | MOBILE STATION 2 → RELAY STATION |
| CHANNEL 12 | MOBILE STATION 4 → BASE STATION |

FIG.14B

| | |
|---|---|
| CHANNEL 1 | MOBILE STATION 1 → RELAY STATION |
| CHANNEL 2 | MOBILE STATION 3 → BASE STATION |
| CHANNEL 3 | MOBILE STATION 1 → RELAY STATION |
| CHANNEL 4 | MOBILE STATION 3 → BASE STATION |
| CHANNEL 5 | MOBILE STATION 1 → RELAY STATION |
| CHANNEL 6 | MOBILE STATION 5 → BASE STATION |
| CHANNEL 7 | MOBILE STATION 5 → BASE STATION |
| CHANNEL 8 | MOBILE STATION 5 → BASE STATION |
| CHANNEL 9 | MOBILE STATION 2 → RELAY STATION |
| CHANNEL 10 | MOBILE STATION 4 → BASE STATION |
| CHANNEL 11 | MOBILE STATION 2 → RELAY STATION |
| CHANNEL 12 | MOBILE STATION 4 → BASE STATION |

FIG.14C

| MOBILE STATION 5: (2,2,3) | MOBILE STATION 3: (8,1,3) | MOBILE STATION 4: (11,1,2) |
|---|---|---|

FIG.15A

| | |
|---|---|
| CHANNEL 1 | RELAY STATION → BASE STATION |
| CHANNEL 2 | MOBILE STATION 5 → BASE STATION |
| CHANNEL 3 | RELAY STATION → BASE STATION |
| CHANNEL 4 | MOBILE STATION 5 → BASE STATION |
| CHANNEL 5 | RELAY STATION → BASE STATION |
| CHANNEL 6 | MOBILE STATION 5 → BASE STATION |
| CHANNEL 7 | RELAY STATION → BASE STATION |
| CHANNEL 8 | MOBILE STATION 3 → BASE STATION |
| CHANNEL 9 | MOBILE STATION 3 → BASE STATION |
| CHANNEL 10 | MOBILE STATION 3 → BASE STATION |
| CHANNEL 11 | MOBILE STATION 4 → BASE STATION |
| CHANNEL 12 | MOBILE STATION 4 → BASE STATION |

FIG.15B

| | |
|---|---|
| CHANNEL 1 | MOBILE STATION 1 → RELAY STATION |
| CHANNEL 2 | MOBILE STATION 3 → BASE STATION |
| CHANNEL 3 | MOBILE STATION 1 → RELAY STATION |
| CHANNEL 4 | MOBILE STATION 3 → BASE STATION |
| CHANNEL 5 | MOBILE STATION 1 → RELAY STATION |
| CHANNEL 6 | MOBILE STATION 5 → BASE STATION |
| CHANNEL 7 | MOBILE STATION 5 → BASE STATION |
| CHANNEL 8 | MOBILE STATION 5 → BASE STATION |
| CHANNEL 9 | MOBILE STATION 2 → RELAY STATION |
| CHANNEL 10 | MOBILE STATION 4 → BASE STATION |
| CHANNEL 11 | MOBILE STATION 2 → RELAY STATION |
| CHANNEL 12 | MOBILE STATION 4 → BASE STATION |

FIG.16A

| MOBILE STATION 5: (2,2,3) | MOBILE STATION 4: (3,4,3) | MOBILE STATION 3: (8,2,3) |
|---|---|---|

FIG.16B

| | |
|---|---|
| CHANNEL 1 | RELAY STATION → BASE STATION |
| CHANNEL 2 | MOBILE STATION 5 → BASE STATION |
| CHANNEL 3 | MOBILE STATION 4 → BASE STATION |
| CHANNEL 4 | MOBILE STATION 5 → BASE STATION |
| CHANNEL 5 | RELAY STATION → BASE STATION |
| CHANNEL 6 | MOBILE STATION 5 → BASE STATION |
| CHANNEL 7 | MOBILE STATION 4 → BASE STATION |
| CHANNEL 8 | MOBILE STATION 3 → BASE STATION |
| CHANNEL 9 | RELAY STATION → BASE STATION |
| CHANNEL 10 | MOBILE STATION 3 → BASE STATION |
| CHANNEL 11 | MOBILE STATION 4 → BASE STATION |
| CHANNEL 12 | MOBILE STATION 3 → BASE STATION |

FIG.16C

| | | |
|---|---|---|
| CHANNEL 1 | MOBILE STATION 1 → RELAY STATION | QPSK, 1/2 |
| CHANNEL 2 | MOBILE STATION 1 → RELAY STATION | QPSK, 1/2 |
| CHANNEL 3 | MOBILE STATION 2 → RELAY STATION | 16QAM, 1/2 |
| CHANNEL 4 | MOBILE STATION 3 → BASE STATION | 16QAM, 1/2 |

FIG.17A

| | | |
|---|---|---|
| CHANNEL 1 | MOBILE STATION 4 → BASE STATION | |
| CHANNEL 2 | RELAY STATION → BASE STATION | 16QAM, 1/2 |
| CHANNEL 3 | RELAY STATION → BASE STATION | 16QAM, 1/2 |
| CHANNEL 4 | MOBILE STATION 5 → BASE STATION | |

FIG.17B

| TOTAL NUMBER OF RECEIVED BITS | NUMBER OF RELAY TRANSMISSION CHANNELS | NUMBER OF TRANSMITTED BITS PER CHANNEL | MCS |
|---|---|---|---|
| 4F | 1 | 4F | 64QAM, 2/3 |
| 4F | 2 | 2F | 16QAM, 1/2 |
| 4F | 3 | 4F/3 | 16QAM, 1/3 |
| 4F | 4 | F | QPSK, 1/2 |

FIG.18

RELAY STATION IN MOBILE COMMUNICATION SYSTEM AND RELAY TRANSMISSION CHANNEL SETTING METHOD

TECHNICAL FIELD

The present invention relates to a relay station and a method for setting relay transmission channels in a mobile communication system.

BACKGROUND ART

In recent years, with the multimediatization of information in cellular mobile communication systems as represented by mobile phones for example, transmitting large capacity data such as still images and movies in addition to speech data has become popular. To realize the transmission of high capacity data, a technology in which a high-frequency radio band is used to provide a high transmission rate is studied actively.

However, when a high-frequency radio band is used, although a high transmission rate can be expected in a short distance, attenuation due to transmission distance becomes greater as the distance increases. Accordingly, when the mobile communication system employing a high-frequency radio band is actually operated, the coverage area of each radio communication base station apparatus (hereinafter "base station") becomes small, which requires that a larger number of base stations be set up. Since the set-up of base stations involves large costs, a technology is strongly demanded for realizing communication services which employ a high-frequency radio band and preventing an increase in the number of base stations.

To meet this demand, various relay transmission technologies are investigated in which radio communication relay station apparatuses (hereinafter "relay stations") are set up between a radio communication mobile station apparatus (hereinafter "mobile station") and a base station, and communication between the mobile station and the base station is carried out via these relay stations.

Among conventional channel allocation methods according to relay transmission technologies, there is a method whereby, based on information about nodes where direct transmission is possible and information about other nodes, a channel to be allocated to a link between nodes that are disallowed transmission and nodes that are not disallowed transmission through communication between predetermined nodes is determined so as to differ from the channel between the predetermined nodes (see Patent Document 1).
Patent Document 1: Japanese Patent Application Laid-Open No. 2006-25388

DISCLOSURE OF INVENTION

Problems to be Solved by the Invention

However, according to the above-described conventional channel allocation method, setting information about all relay transmission channels used by a relay station must be reported to the relay station as control information, which causes the amount of control information to increase and the data throughput to deteriorate.

It is therefore an object of the present invention to provide a relay station and a method for setting relay transmission channels that can reduce control information required for allocation of relay transmission channels in a mobile communication system.

Means for Solving the Problem

The relay station according to the present invention adopts a configuration including: a receiving section that receives a signal from a mobile station in a first frame; a setting section that sets relay transmission channels in a second frame that follows the first frame according to a rule shared between the relay station and a base station based on an allocation result of a receiving channel for receiving the signal; and a transmitting section that carries out relay transmission to the base station in the second frame using the relay transmission channels that are set.

ADVANTAGEOUS EFFECT OF THE INVENTION

The present invention provides an advantage of reducing control information required for allocation of relay transmission channels in a mobile communication system.

BRIEF DESCRIPTION OF DRAWINGS

FIG. 2A shows channel allocation information according to Embodiment 1 of the present invention (frame 1);

FIG. 2B shows channel settings according to Embodiment 1 of the present invention (frame 1);

FIG. 9A shows channel allocation information according to Embodiment 3 of the present invention (frame 2);

FIG. 9B shows channel settings according to Embodiment 3 of the present invention (frame 2);

FIG. 12A shows channel allocation information according to Embodiment 4 of the present invention (setting example 1, frame 1);

FIG. 12B shows channel settings according to Embodiment 4 of the present invention (setting example 1, frame 1);

FIG. 12C shows candidate channels according to Embodiment 4 of the present invention (setting example 1);

FIG. 14A shows channel allocation information according to Embodiment 4 of the present invention (setting example 2, frame 1);

FIG. 14B shows channel settings according to Embodiment 4 of the present invention (setting example 2, frame 1);

FIG. 14C shows candidate channels according to Embodiment 4 of the present invention (setting example 2);

FIG. 15A shows channel allocation information according to Embodiment 4 of the present invention (setting example 2, frame 2);

FIG. 15B shows channel settings according to Embodiment 4 of the present invention (setting example 2, frame 2);

FIG. 16A shows candidate channels according to Embodiment 4 of the present invention (setting example 3);

FIG. 16B shows channel allocation information according to Embodiment 4 of the present invention (setting example 3, frame 2);

FIG. 16C shows channel settings according to Embodiment 4 of the present invention (setting example 3, frame 2);

FIG. 17A shows channel settings according to Embodiment 5 of the present invention (frame 1);

FIG. 17B shows channel settings according to Embodiment 5 of the present invention (frame 2);

FIG. 18 shows the associations between the number of transmission bits per channel of the relay transmission channels and MCS of the relayed signal according to Embodiment 5 of the present invention;

BEST MODE FOR CARRYING OUT THE INVENTION

Now, embodiments of the present invention will be described in detail with reference to the accompanying drawings.

Figure 1:
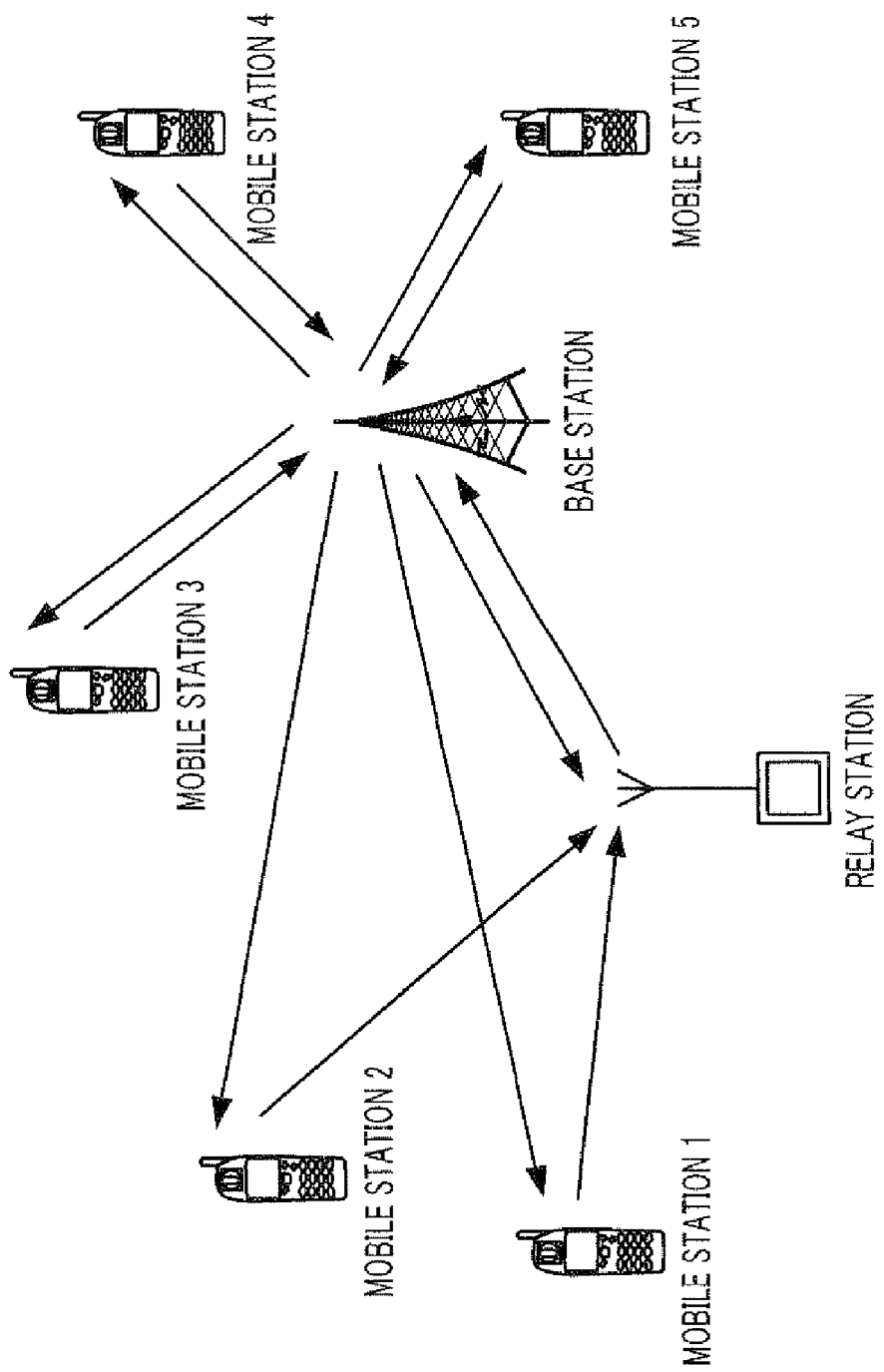
FIG. 1 shows a configuration of the mobile communication system according to the embodiments of the present invention.

FIG. 1 shows a configuration of the mobile communication system according to the embodiments of the present invention. As shown in FIG. 1, in the mobile communication system according to the following embodiments, a relay station relays signals from mobile stations 1 and 2 to a base station over uplinks, whereas signals from the base station directly arrive at mobile stations 1 and 2 over downlinks, and so the relay station does not carry out relay transmission over the downlink. Furthermore, mobile stations 3, 4 and 5 are directly communicating with the base station without involving a relay station. Furthermore, the base station reports the uplink channels allocated to another relay station (not shown) or mobile stations 1 to 5 to the relay station and mobile stations 1 to 5 using channel allocation information over the downlinks, whereas the base station does not report the channel allocation information about the uplink channel allocated to the relay station to the relay station. The relay station sets relay transmission channels (uplink channels between the relay station and the base station) according to a channel allocation rule shared between the relay station and the base station based on the result of allocation of the uplink channels to mobile stations 1 and 2 (uplink channels between mobile stations 1 and 2, and relay station).

The relay station according to the following embodiments may be set in advance, or other mobile stations may be used for the relay stations like in an ad-hoc network (e.g. see Japanese Patent Application Laid-Open No. 2001-189971).

(Embodiment 1)

The relay station in the present embodiment sets relay transmission channels based on channel allocation information in frame 1 and channel allocation information in frame 2 transmitted from the base station. The channel allocation information in frame 1 includes channel allocation information about mobile stations whose relay transmission is assigned to the relay station. The relay station sets relay transmission channels according to a channel allocation rule shared between the relay station and the base station as follows.

First, when the base station transmits the channel allocation information in frame 1 as shown in FIG. 2A, mobile station 1 transmits a signal to the relay station using channels 1 and 2, mobile station 2 transmits a signal to the relay station using channel 3 and mobile station 3 transmits a signal to the base station using channel 4 in frame 1 as shown in FIG. 2B.

Furthermore, the relay station assumes channels 1 to 3 allocated by the base station to mobile stations 1 and 2 of which the relay station is in charge in frame 1 according to the channel allocation information in frame 1 (FIG. 2A) as candidates for the relay transmission channels in frame 2 (FIG. 2B). That is, the relay station assumes receiving channels 1 to 3 to receive signals from mobile stations 1 and 2 of which the relay station is in charge in frame 1 as candidate channels in frame 2 (FIG. 2B).

Figure 3A:
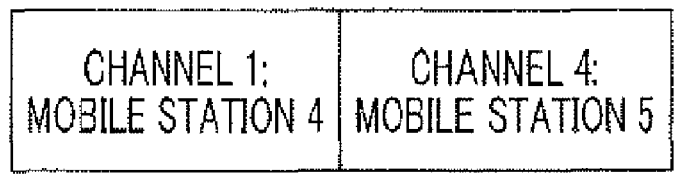
FIG. 3A shows channel allocation information according to Embodiment 1 of the present invention (frame 2)
Figure 3B:
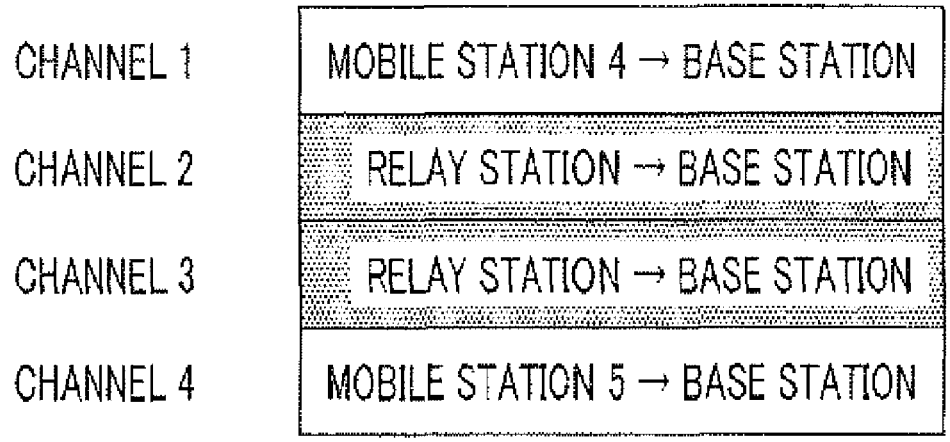
FIG. 3B shows channel settings according to Embodiment 1 of the present invention (frame 2)

Next, when the base station transmits the channel allocation information in frame 2 as shown in FIG. 3A, mobile station 4 transmits a signal to the base station using channel 1 and mobile station 5 transmits a signal to the base station using channel 4 in frame 2 as shown in FIG. 3B.

Furthermore, the relay station sets channels 2 and 3 other than the channels allocated by the base station to the other relay stations or mobile stations in frame 2 out of candidate channels 1 to 3 (FIG. 2B) according to the channel allocation information (FIG. 3A) in frame 2 as the relay transmission channels (FIG. 3B). Here, since channel 1 is allocated to mobile station 4 and channel 4 is allocated to mobile station 5 in frame 2 (FIG. 3A), the relay station sets channels 2 and 3 which have not been allocated by the base station to the other relay stations and mobile stations in frame 2 out of candidate channels 1 to 3 (FIG. 2B) as the relay transmission channels (FIG. 3B). The relay station then carries out relay transmission to the base station using channels 2 and 3.

As shown above, according to the present embodiment, the relay station sets relay transmission channels according to the channel allocation rule that channels other than the channels allocated by the base station to other relay stations or mobile stations out of the receiving channels to receive signals from mobile stations in frame 1 are assumed as the relay transmission channels in frame 2. Furthermore, this channel allocation rule is shared between the relay station and the base station. That is, the relay station according to the present embodiment sets relay transmission channels in frame 2 according to the channel allocation rule shared between the relay station and the base station, based on the result of allocation of receiving channels to receive signals from the mobile stations in frame 1.

Furthermore, since the settings of the relay transmission channels by the relay station are performed according to the channel allocation rule shared between the relay station and the base station, the channel allocation information about the relay transmission channels need not be reported from the base station to the relay station and the base station can know the relay transmission channels set by the relay station without notice from the relay station. Therefore, the present embodiment eliminates the necessity to report channel allocation information about the relay transmission channels between the base station and the relay station, and can thereby reduce control information required for allocation of the relay transmission channels.

In the above example, while the relay station uses a total of three channels to receive signals from mobile stations in frame 1 (FIG. 2B), the relay station is able to use a total of two channels to carry out relay transmission to the base station in frame 2 (FIG. 3B). That is, the number of relay transmission channels in frame 2 is smaller than the number of receiving channels in frame 1. Therefore, in the above example, the relay station cannot relay all signals received from mobile stations 1 and 2 in frame 1 to the base station in frame 2.

Therefore, the relay station and the base station share the order of allocation when the set relay transmission channels are allocated to signals from the respective mobile stations Examples of the order of allocation include the following. That is, (1) channels are allocated in order of the numbers of mobile stations (in ascending order or in descending order), (2) channels are allocated in descending order of QoS (Quality of Service) of mobile stations, (3) channels are allocated in order of channel numbers in frame 1 (in ascending order or in descending order), and (4) channels are allocated in order of signals received through receiving channels of the numbers corresponding to the numbers of relay transmission channels (that is, channels 2 and 3 in FIG. 2A) and so on.

Hereinafter, a case where the order of allocation is used in which relay transmission channels are allocated in order of the numbers of mobile stations (ascending order) will be explained in further detail as an example.

Figure 4:
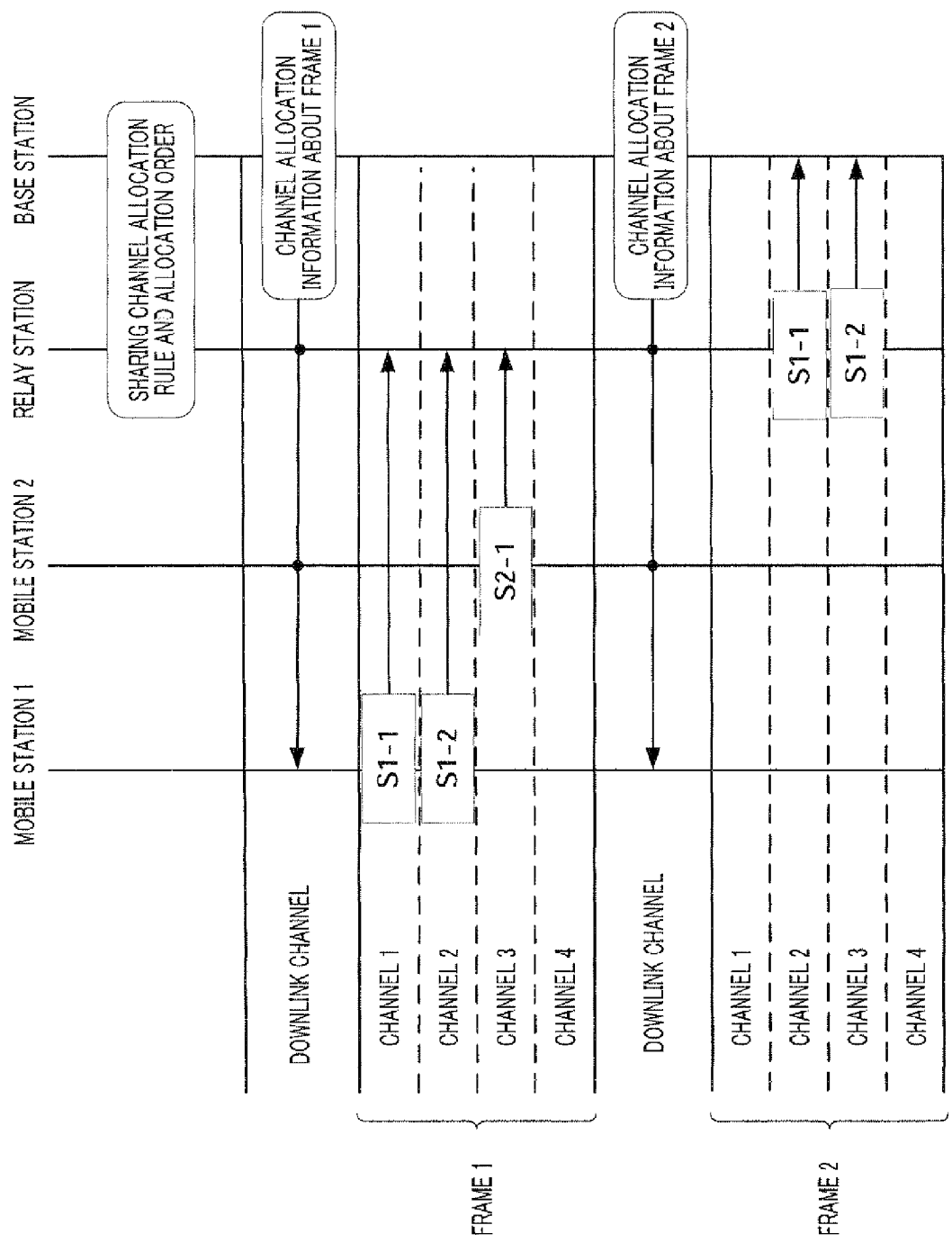
FIG. 4 is a sequence diagram according to Embodiment 1 of the present invention.

FIG. 4 shows a sequence diagram according to the present embodiment.

First, prior to communication, the relay station and the base station share the above-described channel allocation rule and allocation order Next, the base station transmits the channel allocation information in frame 1 (FIG. 2A) to mobile stations 1 and 2 and relay station over downlink channels.

Next, in frame 1, mobile station 1 transmits signal S1-1 through channel 1 and signal S1-2 through channel 2 out of uplink channels 1 to 4 to the relay station according to the channel allocation information (FIG. 2A), and mobile station 2 transmits signal S2-1 through channel 3 out of uplink channels 1 to 4 to the relay station. The relay station then receives these signals.

Next, the base station transmits the channel allocation information about frame 2 (FIG. 3A) to mobile stations 1 and 2 and the relay station through downlink channels. The relay station then sets channels 2 and 3 out of uplink channels 1 to 4 as the relay transmission channels as described above (FIG. 3B). Furthermore, to allocate the relay transmission channels in order of the numbers of the mobile stations (ascending order), the relay station allocates signals S1-1 and S1-2 received from mobile station 1 through channels 1 and 2 in frame 1 to relay transmission channels 2 and 3.

Therefore, in frame 2, the relay station relays signal S1-1 through channel 2 and signal S1-2 through channel 3 out of uplink channels 1 to 4 to the base station. The base station then receives these signals.

Since the relay station has fewer relay transmission channels in frame 2 than receiving channels in frame 1, the relay station sets the relay transmission channels in frame 3 in the same way as described above, allocates signal S2-1 which could not be relayed in frame 2 to one of the relay transmission channels in frame 3 and relays signal S2-1 to the base station in frame 3.

Figure 5:
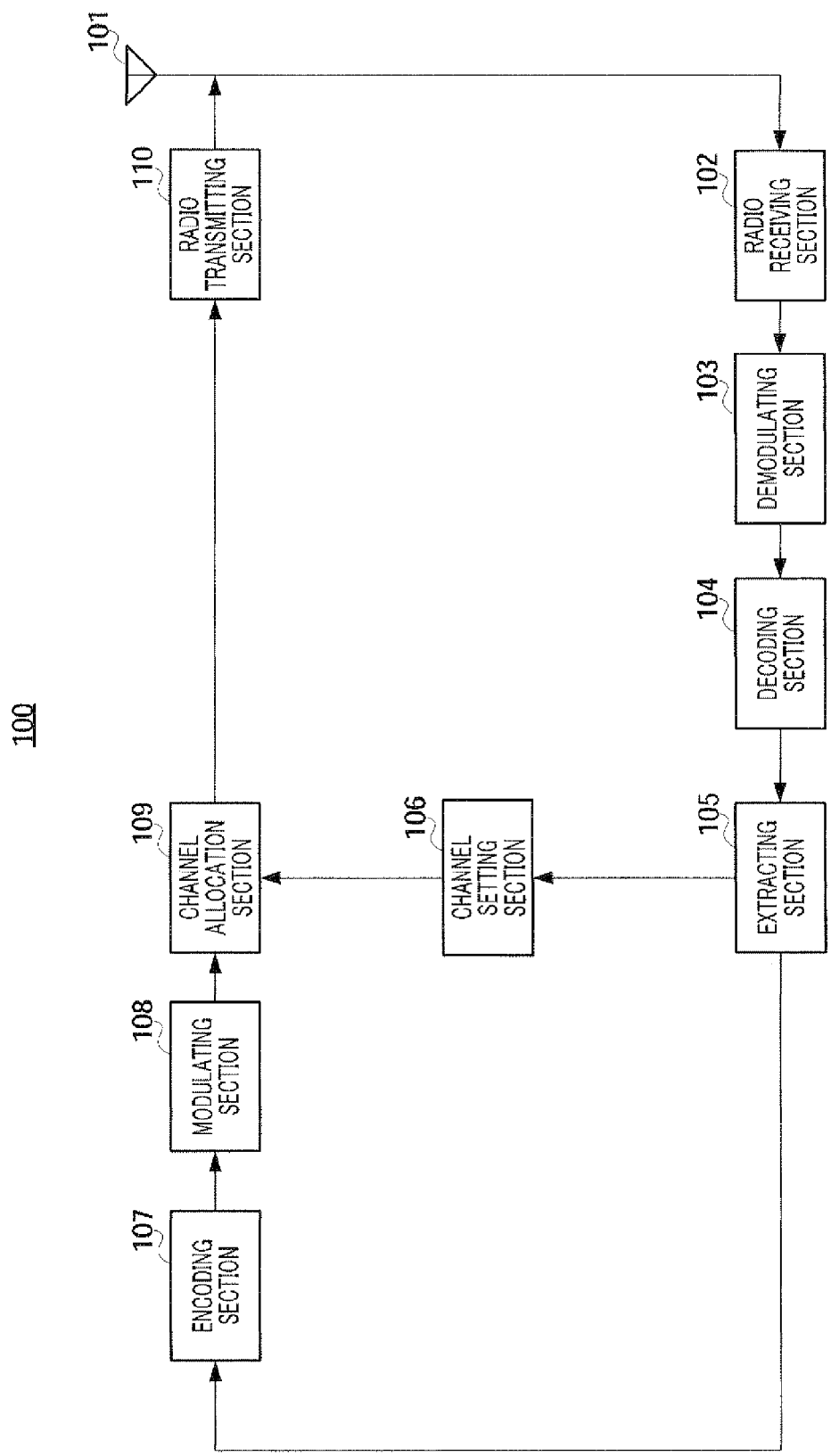
FIG. 5 is a block diagram showing the relay station according to Embodiment 1 of the present invention.

Next, a configuration of the relay station according to the present embodiment will be explained. FIG. 5 shows a configuration of relay station 100 according to the present embodiment.

In relay station 100, radio receiving section 102 receives a signal from a mobile station and channel allocation information from a base station through antenna 101, performs radio processing such as down-conversion and outputs the signal and channel allocation information to demodulating section 103.

Demodulating section 103 demodulates the signal from the mobile station and the channel allocation information from the base station, and outputs the demodulated signal and information to decoding section 104.

Decoding section 104 decodes the signal from the mobile station and the channel allocation information from the base station, and outputs the decoded signal and information to extracting section 105.

Extracting section 105 extracts the signal from the mobile station from the signal inputted from decoding section 104, outputs the extracted signal to encoding section 107 and also extracts the channel allocation information from the base station and outputs the extracted channel allocation information to channel setting section 106

Channel setting section 106 saves the channel allocation information in each frame and sets relay transmission channels based on the channel allocation result shown in the channel allocation information according to the channel allocation rule shared between relay station 100 and the base station as described above. Channel setting section 106 outputs the setting result of the relay transmission channels to channel allocation section 109.

Encoding section 107 re-encodes the signal from the mobile station and outputs the encoded signal to modulating section 108.

Modulating section 108 re-modulates the signal from the mobile station and outputs the modulated signal to channel allocation section 109.

Channel allocation section 109 allocates the modulated signal to one of the relay transmission channels according to the allocation order shared between relay station 100 and the base station as described above, and outputs the modulated signal to radio transmitting section 110.

Radio transmitting section 110 performs radio processing such as up-conversion to the modulated signal and relays the modulated signal to the base station from antenna 101.

Figure 6:
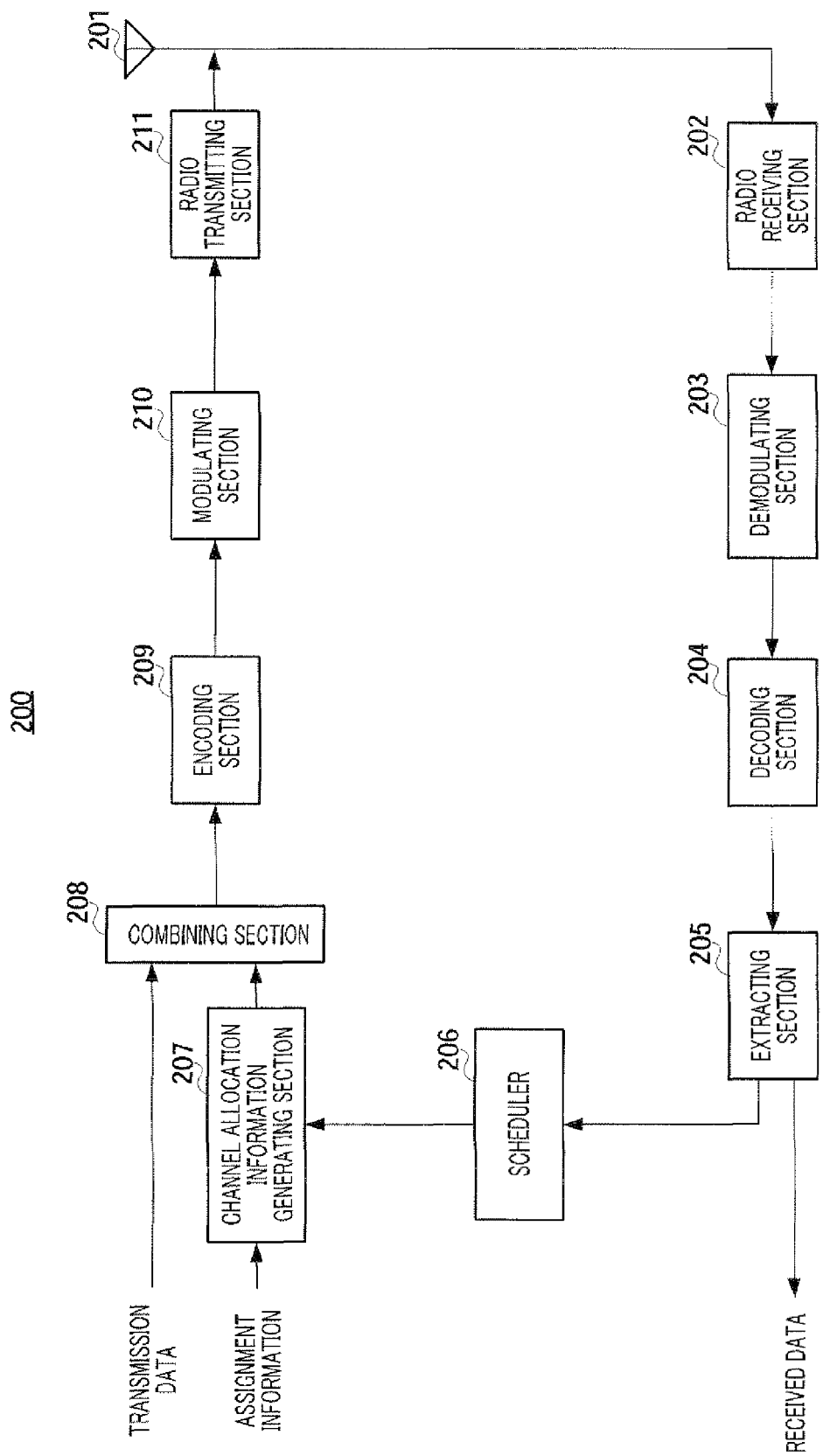
FIG. 6 is a block diagram showing a configuration of the base station according to Embodiment 1 of the present invention.

Next, a configuration of the base station according to the present embodiment will be explained. FIG. 6 shows a configuration of base station 200 according to the present embodiment.

In base station 200, radio receiving section 202 receives a signal from the mobile station and a signal from the relay station via antenna 201, performs radio processing such as down-conversion and outputs the signals to demodulating section 203.

Demodulating section 203 demodulates the signal from the mobile station and the signal from the relay station and outputs the demodulated signals to decoding section 204.

Decoding section 204 decodes the signal from the mobile station and the signal from the relay station, and outputs the decoded signals to extracting section 205.

Extracting section 205 extracts a data part from the signal inputted from decoding section 204, outputs the data part as received data and also extracts control information from the mobile station and outputs the control information to scheduler 206. This control information includes the number of bits whose transmission is requested by the mobile station, channel quality information about the downlink and QoS information about the mobile station or the like.

Scheduler 206 performs channel scheduling for determining which channel should be allocated to which mobile station or which relay station based on the control information from the mobile station, and outputs the channel scheduling result to channel allocation information generating section 207.

Furthermore, channel allocation information generating section 207 receives assignment information indicating the mobile station of which relay station 100 is in charge as input. The mobile station of which relay station 100 is in charge is determined based on the positional relationship between relay station 100 and each mobile station.

Channel allocation information generating section 207 generates the above-described channel allocation information according to the assignment information, channel scheduling result and channel allocation rule shared between base station 200 and relay station 100, and outputs the channel allocation information to combining section 208. Channel allocation information generating section 207 saves the channel allocation information and the assignment information in each frame and generates channel allocation information comprised of only channels that need to be reported to the mobile station out of the channel scheduling result in frame 2 based on the channel allocation rule, channel allocation information in frame 1 and assignment information as channel allocation information in frame 2.

Combining section 208 combines the transmission data and the channel allocation information, and outputs the combined data to encoding section 209.

Encoding section 209 encodes the transmission data and channel allocation information, and outputs the encoded data to modulating section 210.

Modulating section 210 modulates the transmission data and channel allocation information, and outputs the modulated data to radio transmitting section 211.

Radio transmitting section 211 performs radio processing such as up-conversion to the modulated signal and transmits the modulated signal from antenna 201 to relay station 100 or each mobile station.

Next, relay station 100 that operates in the sequence shown in FIG. 4 will be explained.

First, radio receiving section 102 receives the channel allocation information (FIG. 2A) of frame 1 from the base station. The channel allocation information about this frame 1 is inputted to channel setting section 106 via demodulating section 103, decoding section 104 and extracting section 105. Channel setting section 106 saves the channel allocation information about frame 1.

Next, in frame 1, radio receiving section 102 receives signal S1-1 from mobile station 1 through channel 1 and signal S1-2 through channel 2, and signal S2-1 from mobile station 2 through channel 3 These signals are inputted to channel allocation section 109 via demodulating section 103, decoding section 104, extracting section 105, encoding section 107 and modulating section 108.

Next, radio receiving section 102 receives channel allocation information about frame 2 (FIG. 3A) from the base station. This channel allocation information about frame 2 is inputted to channel setting section 106 via demodulating section 103, decoding section 104 and extracting section 105. Channel setting section 106 saves the channel allocation information about frame 2.

Next, channel setting section 106 sets channels 2 and 3 out of uplink channels 1 to 4 as the relay transmission channels as described above (FIG. 3B) using the channel allocation information about the mobile station for which relay station 100 carries out relay transmission out of the channel allocation information about frame 1 (FIG. 2A) and channel allocation information about frame 2 (FIG. 3A) according to the channel allocation rule. Channel setting section 106 then outputs the setting result of the relay transmission channels to channel allocation section 109.

Next, channel allocation section 109 allocates signals S1-1 and S1-2 to relay transmission channels 2 and 3 according to the allocation order.

In frame 2, radio transmitting section 110 relays signal S1-1 using channel 2 and signal S1-2 using channel 3 out of uplink channels 1 to 4 to the base station.

In this way, the present embodiment eliminates the necessity to report channel allocation information about the relay transmission channels between the base station and relay station, and can thereby reduce control information required for channel allocation of the relay transmission channels.

According to the present embodiment, the relay station may further set channels allocated by the base station to a mobile station that transmits a signal to another relay station in frame 2 out of the candidate channels as the relay transmission channels. This is because the channels allocated to the mobile station that transmits a signal to the other relay station are assumed not to interfere with the relay transmission channels.

(Embodiment 2)

A case will be explained in the present embodiment where a signal transmitted from the mobile station is comprised of systematic bits and parity bits.

Figure 7A:
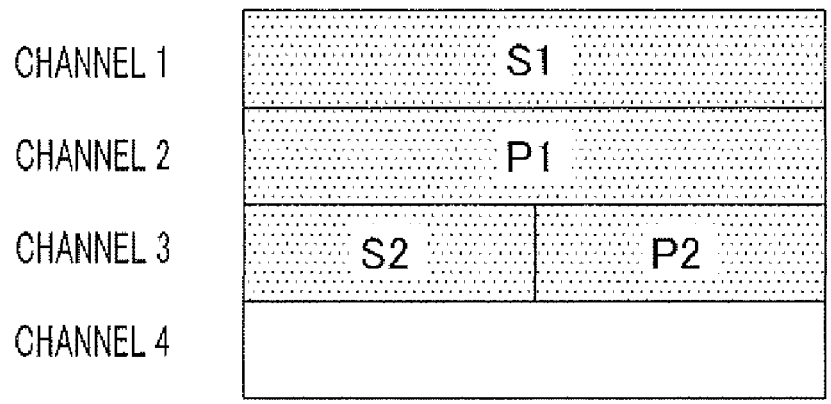
FIG. 7A shows channel settings according to Embodiment 2 of the present invention (frame 1)

When the base station transmits channel allocation information in frame 1 as shown in FIG. 2A, mobile station 1 transmits systematic bit S1 through channel 1 and parity bit P1 through channel 2 to the relay station in frame 1 and mobile station 2 transmits systematic bit S2 and parity bit P2 through channel 3 to the relay station as shown in FIG. 7A. The relay station then receives these signals.

Figure 7B:
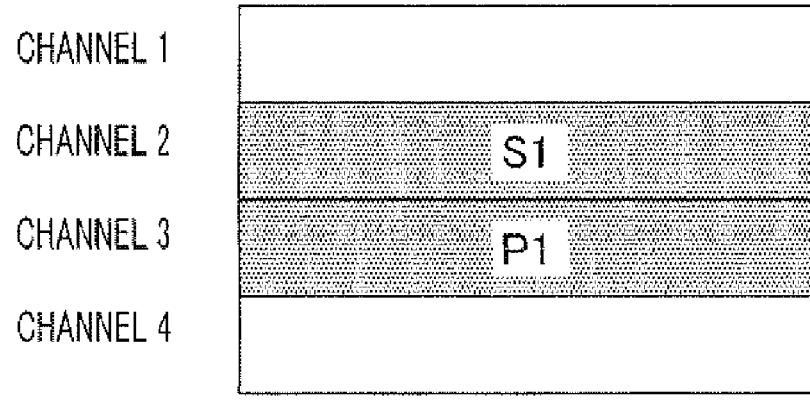
FIG. 7B shows channel settings according to Embodiment 2 of the present invention (frame 2)

Next, when the base station transmits the channel allocation information in frame 2 as shown in FIG. 3A, the relay station sets channels 2 and 3 out of uplink channels 1 to 4 in frame 2 as the relay transmission channels as shown in FIG. 7B as described above. Furthermore, to allocate the relay transmission channels in order of the numbers of mobile stations (in ascending order), the relay station allocates systematic bit S1 and parity bit P1 received from mobile station 1 in frame 1 to relay transmission channels 2 and 3. Therefore, in frame 2, the relay station relays systematic bit S1 through channel 2 and parity bit P1 through channel 3 out of uplink channels 1 to 4 to the base station.

Furthermore, when MCS (Modulation and Coding Scheme) can be changed between frames, the relay station may also generate new parity bits as follows. Here, suppose the coding rate according to MCS in frame 1 is ½ and the coding rate according to MCS in frame 2 is ¾.

Since the coding rate in frame 1 is ½, the relay station receives systematic bit S1 from mobile station 1 through channel 1, parity bit P1 through channel 2, and receives systematic bit S2 and parity bit P2 from mobile station 2 through channel 3 as shown in FIG. 7A. Therefore, the relay station receives systematic bits corresponding to a total of 1.5 channels in frame 1.

Figure 8:
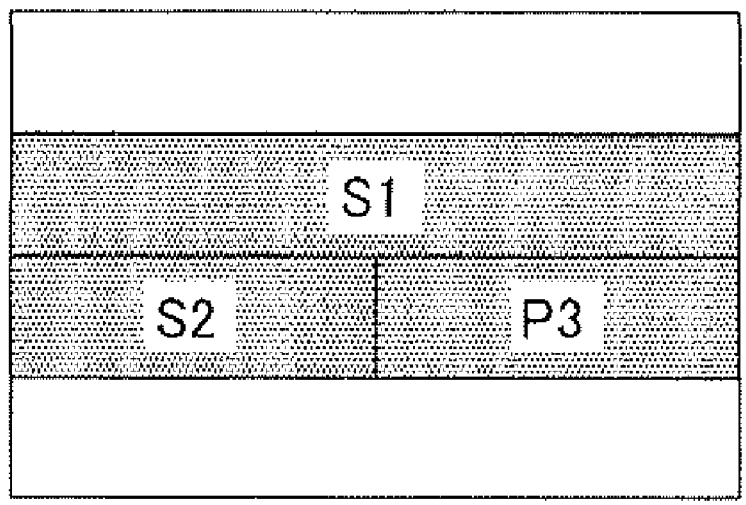
FIG. 8 shows channel settings according to Embodiment 2 of the present invention (frame 2)

Relaying systematic bits corresponding to 1.5 channels at coding rate ¾ requires 1.5×4/3=2 channels. Therefore, the relay station relays systematic bits S1 and S2 to the base station using channels 2 and 3 set as the relay transmission channels as shown in FIG. 8. Furthermore, the relay station transmits parity bit P3 newly generated from systematic bits S1 and S2 to the base station using channel 3. The relay station may also generate a new parity bit for every mobile station.

(Embodiment 3)

The relay station according to the present embodiment sets relay transmission channels according to a channel allocation rule that the relay station assumes receiving channels to receive signals from mobile stations in frame 1 and channels allocated to the relay station in frame 2 as relay transmission channels. Furthermore, as described above, this channel allocation rule is to be shared between the relay station and the base station.

First, when the base station transmits channel allocation information in frame 1 as shown in FIG. 2A, mobile station 1 transmits signals to the relay station using channels 1 and 2 in frame 1, mobile station 2 transmits a signal to the relay station using channel 3 and mobile station 3 transmits a signal to the base station using channel 4 as shown in FIG. 2B.

Next, when the base station transmits the channel allocation information in frame 2 as shown in FIG. 9A, the relay station sets channels 1 to 3 allocated by the base station to mobile stations 1 and 2 of which the relay station is in charge in frame 1 and channel 4 allocated by the base station to the relay station in frame 2 as the relay transmission channels in frame 2 according to the channel allocation information in frame 1 (FIG. 2A) and channel allocation information in frame 2 (FIG. 9A) in frame 2 as shown in FIG. 9B. That is, the relay station assumes receiving channels 1 to 3 to receive signals from mobile stations 1 and 2 of which the relay station is in charge in frame 1 and channel 4 newly allocated in relay transmission in frame 2 as the relay transmission channels. The relay station then carries out relay transmission to the base station using channels 1 to 4.

As described above, according to the present embodiment, it is necessary to report only channels to be newly allocated to the relay station in frame 2 out of the relay transmission channels from the base station to the relay station, and it is thereby possible to reduce control information necessary to allocate relay transmission channels.

(Embodiment 4)

The relay station according to the present embodiment relays signals using successive channels or signals using periodical channels. In particular, signals using successive channels are used in data parts in single carrier transmission and signals using periodical channels are used in data parts and pilot parts in single carrier transmission.

Here, compared to OFDM (Orthogonal Frequency Division Multiplexing) transmission, single carrier transmission has an advantage that it is possible to reduce peak power on the transmitting side and is a technique that is attracting attention. Peak power on the transmitting side is generated by superimposing a plurality of frequencies. Single carrier transmission adopts two transmission methods to suppress peak power.

One is a method of suppressing peak power using successive channels (frequencies) as one channel. The other is a method of suppressing peak power using periodical channels (frequencies) on the frequency axis by generating signals repeating on the time axis.

Figure 10:
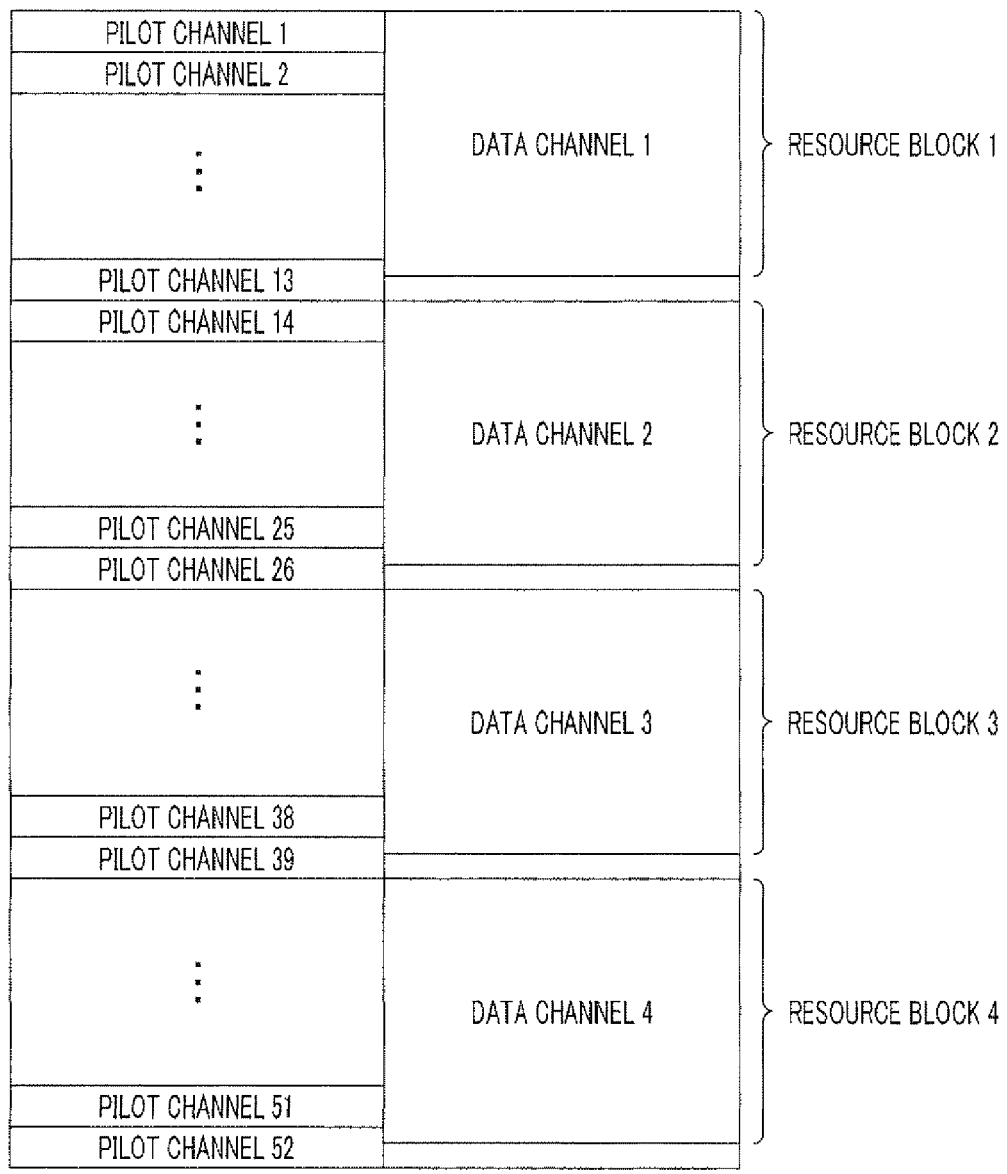
FIG. 10 shows a channel configuration of single carrier transmission according to Embodiment 4 of the present invention (configuration example 1)

FIG. 10 shows a channel configuration (configuration example 1) of single carrier transmission. Here, data channels are allocated in resource block units. Furthermore, pilot channels are allocated in units smaller than resource blocks. This is because pilots are transmitted not only to mobile stations that transmit data but also to terminals that do not transmit data, and therefore a pilot channel is divided into frequencies smaller than a resource block so as to allow a plurality of mobile stations to perform channel estimation of the same resource block simultaneously. For example, channel estimation of data channel 1 can be performed using one of pilot channel 1 and pilot channel 2.

Figure 11:
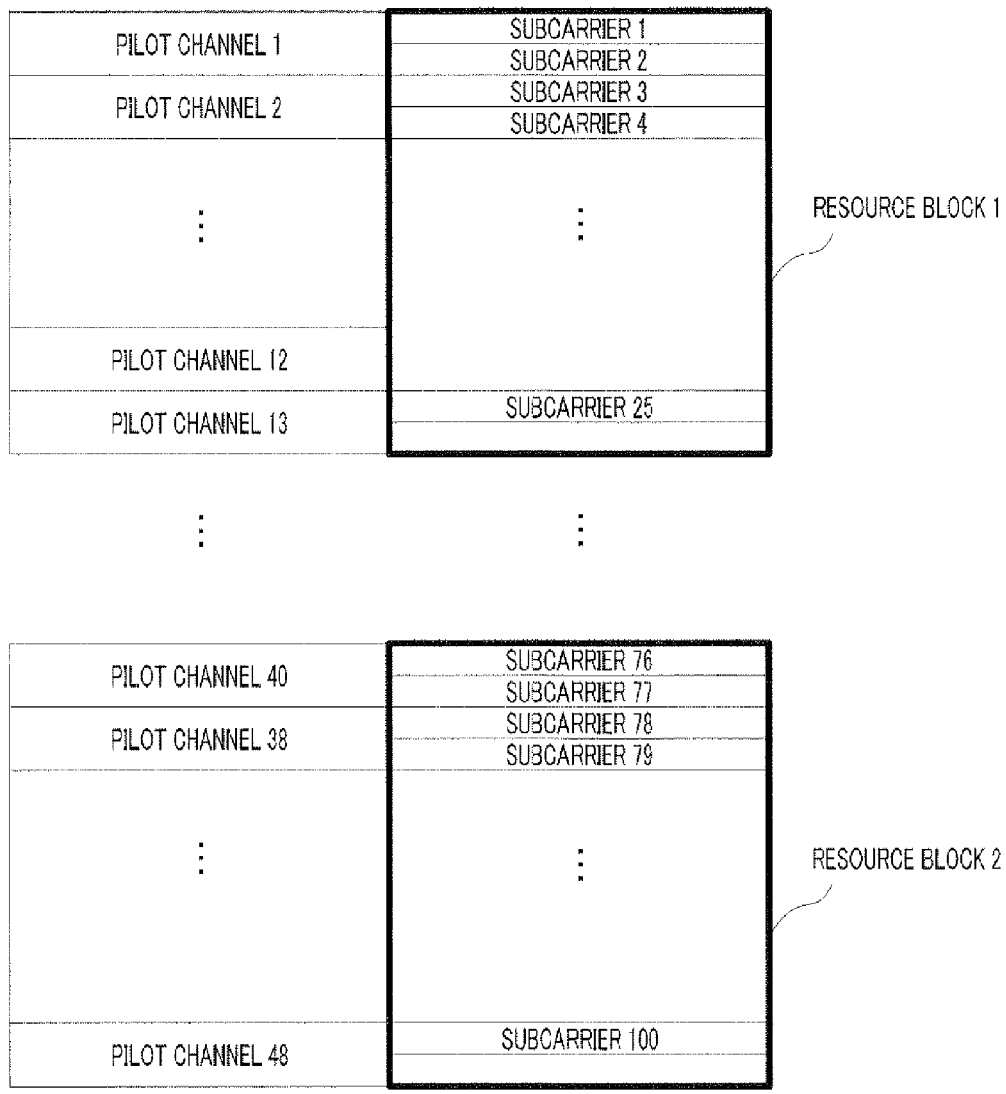
FIG. 11 shows a channel configuration of single carrier transmission according to Embodiment 4 of the present invention (configuration example 2)

FIG. 11 shows a channel configuration (configuration example 2) where a resource block is further divided into smaller subcarriers and data are allocated thereto. In this example, each subcarrier is reduced to half the size of each pilot channel. Furthermore, data channels are allocated in subcarrier units.

Use of periodical channels on the frequency axis to transmit pilots is under study when one of the channel configuration of configuration example 1 and the channel configuration of configuration example 2 is adopted. Allocating periodical channels (frequencies) to a plurality of mobile stations so as not to overlap with each other allows a plurality of mobile stations to perform channel estimation on the same data channel simultaneously.

On the other hand, adopting both successive channels and periodical channels for data channels is under study. When the channel configuration of configuration example 1 is adopted, data channels become successive channels. Furthermore, when the channel configuration of configuration example 2 is adopted, data channels may be successive channels or may be periodical channels. When data channels are successive channels in configuration example 2, consecutive subcarriers are treated as one data channel.

When successive channels are used for data channels, since pilots corresponding to data need to be periodically arranged only near the successive channels, the number of pilot channels can be reduced and this makes scheduling easier. On the other hand, when periodical channels are used for data channels and arranged at frequency intervals in configuration example 2, frequency diversity effect can be provided. However, when data channels are arranged at frequency intervals, pilots need to be likewise arranged at frequency intervals to perform channel estimation at the respective frequencies. When pilots are arranged at frequency intervals, the complementation accuracy of channel estimate values deteriorates and the channel estimation accuracy deteriorates as the interval increases. Therefore, it is desirable to adopt successive channels as data channels and increase the channel estimation accuracy on pilot channels.

The relay station according to the present embodiment relays signals using successive channels or signals using periodical channels in such single carrier transmission. Hereinafter, channel setting examples 1 to 3 for relay transmission according to the present embodiment will be explained.

Setting Example 1

FIGS. 12A to C, FIGS. 13A and B

In this setting example, the relay station relays signals using successive channels. Furthermore, the relay station in this setting example sets relay transmission channels according to a channel allocation rule that out of a plurality of successive channels between a minimum numbered receiving channel and a maximum numbered receiving channel among receiving channels for the relay station to receive signals from mobile stations in frame 1, channels other than channels allocated by the base station to other relay stations or mobile stations in frame 2 are assumed to be relay transmission channels. Furthermore, as described above, this channel allocation rule is shared between the relay station and the base station. This example will be explained in detail below.

First, when the base station transmits channel allocation information in frame 1 as shown in FIG. 12A, mobile station 1 transmits a signal to the relay station using channel 1, mobile station 2 transmits a signal to the relay station using channel 3, mobile station 3 transmits a signal to the base station using channel 4 and mobile station 4 transmits a signal to the base station using channel 2 in frame 1 as shown in FIG. 12B.

Furthermore, the relay station assumes a plurality of successive channels 1 to 3 between minimum numbered channel 1 and maximum numbered channel 3 out of channels 1 and 3 allocated by base station to mobile stations 1 and 2 of which the relay station is in charge in frame 1 according to the channel allocation information in frame 1 (FIG. 12A) as candidates of relay transmission channels in frame 2 (FIG. 12C) That is, the relay station assumes a plurality of successive channels between a minimum numbered receiving channel and a maximum numbered receiving channel from among receiving channels to receive signals from mobile stations 1 and 2 of which the relay station is in charge in frame 1 as the candidate channels in frame 2. Determining the candidate channels in this way allows the candidate channels to be successive channels.

Figures 13A, 13B:
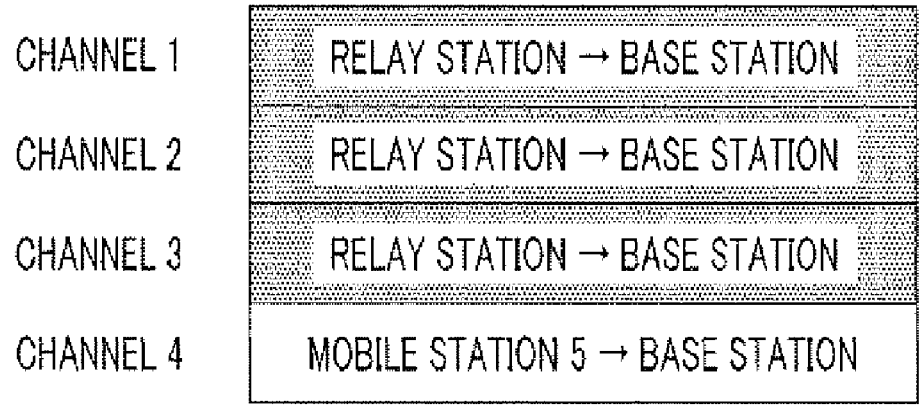
FIG. 13A shows channel allocation information according to Embodiment 4 of the present invention (setting example 1, frame 2)
FIG. 13B shows channel settings according to Embodiment 4 of the present invention (setting example 1, frame 2)

Next, when the base station transmits the channel allocation information in frame 2 as shown in FIG. 13A, mobile station 5 transmits a signal to the base station using channel 4 in frame 2 as shown in FIG. 13B.

Furthermore, the relay station sets channels 1 to 3 other than channels allocated by the base station to other relay stations or mobile stations in frame 2 out of candidate channels 1 to 3 according to the channel allocation information in frame 2 (FIG. 13A) as the relay transmission channels (FIG. 13B). Therefore, the relay station sets all channels 1 to 3 which have not been allocated by the base station to the other relay stations and mobile stations in frame 2 out of candidate channels 1 to 3 as the relay transmission channels (FIG. 13B). The relay station then carries out relay transmission to the base station using channels 1 to 3.

Setting Example 2

FIGS. 14A to C, FIGS. 15A and B

In this setting example, the relay station relays signals using periodical channels. Furthermore, mobile stations also transmit signals using periodical channels. Furthermore, the relay station in this setting example sets relay transmission channels according to a channel allocation rule that a minimum numbered receiving channel having a maximum period among a plurality of receiving channels in frame 1 is used as a reference, channels corresponding in number to the receiving channels in frame 1 for the maximum period are assumed as candidate channels and channels other than channels allocated by the base station to other relay stations or mobile stations in frame 2 out of those candidate channels are set as the relay transmission channels. Furthermore, in the same way as described above, this channel allocation rule is shared between the relay station and the base station. Hereinafter, this example will be explained in detail.

First, when the base station transmits channel allocation information in frame 1 as shown in FIG. 14A, mobile station 1 transmits signals to the relay station using channels 1, 3 and 5, mobile station 2 transmits signals to the relay station using channels 9 and 11, mobile station 3 transmits signals to the base station using channels 2 and 4, mobile station 4 transmits signals to the base station using channels 10 and 12 and mobile station 5 transmits signals to the base station using channels 6 to 8 in frame 1 as shown in FIG. 14B. In the channel allocation information (A, B, C) shown in FIG. 14A, "A" is the start channel allocated to the mobile station, "B" is the period of the allocated channel and "C" is the number of channels. Therefore, mobile station 1, for example, has channel allocation information (1, 2, 3), and, therefore, assuming channel 1 is the start channel, three channels 1, 3 and 5 are allocated in period 2.

Furthermore, the relay station determines the periods of relay transmission channels in frame 2 according to the channel allocation information in frame 1 (FIG. 14A). The relay station assumes the maximum period among the periods of channels allocated by the base station to mobile stations 1 and 2 of which the relay station is in charge in frame 1 as the period of the relay transmission channels in frame 2. Here, since the channel period is 2 for both mobile station 1 and mobile station 2, the relay station sets the periods of the relay transmission channels to 2. Furthermore, since a smaller numbered channel is allocated to mobile station 1, the relay station sets channel 1 allocated to mobile station 1 as a reference channel. That is, the relay station uses the minimum numbered receiving channel having the maximum period among the plurality of receiving channels in frame 1 as a reference channel. The relay station then assumes channels corresponding in number to receiving channels in frame 1 having period 2 as candidates of the relay transmission channels using channel 1 as a reference. In frame 1, mobile station 1 transmits signals using three channels of channels 1, 3 and 5, mobile station 2 transmits signals using two channels of channels 9 and 11, and so the number of receiving channels at the relay station in frame 1 is 5 and therefore the relay station assumes the five channels of channels 1, 3, 5, 7 and 9 as candidate channels in frame 2 (FIG. 14C). Determining candidate channels in this way allows the candidate channels to be periodical channels and allows a wide range of channels to be candidate channels Next, when the base station transmits channel allocation information in frame 2 as shown in FIG. 15A, mobile station 3 transmits signals to the base station using channels 8, 9 and 10, mobile station 4 transmits signals to the base station using channels 11 and 12 and mobile station 5 transmits signals to the base station using channels 2, 4 and 6 in frame 2 as shown in FIG. 15B.

Furthermore, the relay station sets channels 1, 3, 5 and 7 other than the channels allocated by the base station to other relay stations or mobile stations in frame 2 out of candidate channels 1, 3, 5, 7 and 9 as the relay transmission channels (FIG. 15B) according to the channel allocation information in frame 2 (FIG. 15A). Here, since channel 9 is allocated to mobile station 3 in frame 2 (FIG. 15A), the relay station sets channels 1, 3, 5 and 7 which have not been allocated by the base station to the other relay stations and mobile stations in frame 2 out of candidate channels 1, 3, 5, 7 and 9 as the relay transmission channels (FIG. 15B). The relay station then carries out relay transmission to the base station using channels 1, 3, 5 and 7.

In this setting example, a minimum period, average period or fixed period may be used instead of the maximum period. Furthermore, a greater numbered channel may also be used as a reference channel.

Setting Example 3

FIGS. 14A, B, FIGS. 16A to C

In this setting example, the relay station relays signals using periodical channels as in the case of setting example 2.

Furthermore, mobile stations also transmit signals using periodical channels. Furthermore, the relay station in this setting example sets relay transmission channels according to a channel allocation rule that maximum number of channels for a fixed period among a plurality of receiving channels in frame 1 are assumed as candidate channels and channels other than channels allocated by the base station to other relay stations or mobile stations in frame 2 out of those candidate channels are set as the relay transmission channels. Furthermore, this channel allocation rule is shared between the relay station and the base station in the same way as described above. Hereinafter, this example will be explained in detail.

First, when the base station transmits channel allocation information in frame 1 as shown in FIG. 14A, mobile station 1 transmits signals to the relay station using channels 1, 3 and 5, mobile station 2 transmits signals to the relay station using channels 9 and 11, mobile station 3 transmits signals to the base station using channels 2 and 4, mobile station 4 transmits signals to the base station using channels 10 and 12 and mobile station 5 transmits signals to the base station using channels 6 to 8 in frame 1 as shown in FIG. 14B.

Furthermore, the relay station searches for a combination of channels to provide a maximum number of channels for a fixed period for channels 1, 3, 5, 9 and 11 allocated by the base station to mobile stations 1 and 2 of which the relay station is in charge in frame 1 according to the channel allocation information in frame 1 (FIG. 14A). Here, when period 2 is assumed for channels 1, 3, 5, 9 and 11, a combination of channels 1, 3 and 5 (combination 1) is provided and when period 4 s assumed, a combination of channels 1, 5 and 9 (combination 2) is provided. In channels 1, 3, 5, 9 and 11, no combination other than these combinations exists that includes three or more channels with a fixed period. Therefore, the maximum number of channels in both combinations 1 and 2 is 3 here. Furthermore, since the period of combination 2 is greater than the period of combination 1, the relay station assumes channels 1, 5 and 9 of combination 2 as candidates of the relay transmission channels in frame 2 (FIG. 16A). That is, the relay station assumes a maximum number of channels with a fixed period among receiving channels to receive signals from mobile stations 1 and 2 of which the relay station is in charge in frame 1 as candidate channels in frame 2. Determining candidate channels in this way allows the candidate channels to be periodical channels and also allows a wide range of channels to be candidate channels.

Next, when the base station transmits channel allocation information in frame 2 as shown in FIG. 16B, mobile station 3 transmits signals to the base station using channels 8, 10 and 12, mobile station 4 transmits signals to the base station using channels 3, 7 and 11 and mobile station 5 transmits signals to the base station using channels 2, 4 and 6 in frame 2 as shown in FIG. 16C.

Furthermore, the relay station sets channels 1, 5 and 9 other than the channels allocated by the base station to the other relay stations or mobile stations in frame 2 out of candidate channels 1, 5 and 9 according to the channel allocation information in frame 2 (FIG. 16B) as the relay transmission channels (FIG. 16C). Therefore, the relay station sets all channels 1, 5 and 9 which have not been allocated by the base station to the other relay stations and mobile stations in frame 2 out of candidate channels 1, 5 and 9 as the relay transmission channels (FIG. 16C). The relay station then carries out relay transmission to the base station using channels 1, 5 and 9.

Setting examples 1 to 3 have been explained so far.

In the present embodiment, different channel allocation rules may also be applied to data channels and pilot channels.

(Embodiment 5)

The present embodiment determines MCS of a relayed signal based on the number of relay transmission channels and the amount of data of the relayed signal. A case will be explained hereinafter where Embodiment 1 is combined with the present embodiment, but the present embodiment can be combined with any one of Embodiments 2 to 4. Furthermore, the present embodiment can also be singly implemented without combining with the above-described embodiments.

First, when the base station transmits channel allocation information in frame 1 as shown in FIG. 2A, mobile station 1 transmits signals to the relay station using channels 1 and 2 according to a modulation scheme: QPSK and coding rate: ½, mobile station 2 transmits signals to the relay station using channel 3 according to a modulation scheme: 16QAM and coding rate; ½, and mobile station 3 transmits signals to the base station using channel 4 according to a modulation scheme: 16QAM and coding rate: ½ in frame 1 as shown in FIG. 17A. These MCSs are reported from the base station to each mobile station and relay station in advance.

Furthermore, the relay station assumes channels 1 to 3 allocated by the base station to mobile stations 1 and 2 of which the relay station is in charge in frame 1 according to the channel allocation information in frame 1 (FIG. 2A) as candidates of relay transmission channels in frame 2 (FIG. 17A). That is, the relay station assumes receiving channels 1 to 3 to receive signals from mobile stations 1 and 2 of which the relay station is in charge in frame 1 as candidate channels in frame 2 (FIG. 17A).

Furthermore, the relay station calculates the sum of the number of bits of the signal received from mobile station 1 and the number of bits of the signal received from mobile station 2 in frame 1 (total number of received bits) from the MCS information in frame 1 and channel allocation information in frame 1. Assuming that the number of symbols that can be transmitted per channel is "F," the number of received bits per mobile station can be calculated from following equation 1. By the way, the M-ary modulation value is 1 for BSPK, 2 for QPSK, 4 for 16QAM and 6 for 64QAM. Furthermore, when the received signal includes both information bits and redundancy bits, the number of received bits is the number of information bits and the number of redundancy bits is not included in the number of received bits.

Number of received bits=$F$×number of channels×M-ary modulation value×coding rate  (Equation 1)

Therefore, the number of received bits from mobile station 1 is F×2×2×½)=2F and the number of received bits from mobile station 2 is F×1×4×(½)=2F. Therefore, the total number of received bits is 2F+2F=4F.

Next, when the base station transmits channel allocation information in frame 2 as shown in FIG. 3A, mobile station 4 transmits signals to the base station using channel 1 and mobile station 5 transmits signals to the base station using channel 4 in frame 2 as shown in FIG. 17B.

Furthermore, the relay station sets channels 2 and 3 other than channels allocated by the base station to the other relay stations or mobile stations in frame 2 out of candidate channels 1 to 3 (FIG. 17A) according to the channel allocation information in frame 2 (FIG. 3A) as the relay transmission channels (FIG. 17A). Therefore, the number of relay transmission channels is 2.

Next, the relay station determines the MCS of a signal relayed in frame 2 from the total number of received bits (that is, amount of data of the relayed signal) and the number of relay transmission channels as follows.

First, the relay station calculates the number of transmitted bits per relay transmission channel. The number of transmitted bits per channel can be calculated by dividing the total number of received bits by the number of relay transmission channels. Therefore, when the total number of received bits is 4F and the number of relay transmission channels is 2, the number of transmitted bits per channel is 2F.

The relay station then determines the MCS of the relayed signal from the number of transmitted bits per channel. Here, since the number of transmitted bits per channel is 2F, suppose the MCS of the relayed signal is a modulation scheme: 16QAM and coding rate: ½. By so doing, the relay station can relay a total of 4F received signals using two relay transmission channels, channels 2 and 3.

Therefore, the relay station carries out relay transmission to the base station using channels 2 and 3 according to a modulation scheme: 16QAM and coding rate: ½ in frame 2 as shown in FIG. 17B.

FIG. 18 shows the associations between the total number of received bits, number of relay transmission channels, number of transmitted bits per relay transmission channel and MCS of relayed signals when the total number of received bits is 4F. In FIG. 18, the total number of received bits and the number of transmitted bits are the number of information bits and do not include the number of redundancy bits.

As described above, according to the present embodiment, the relay station determines the MCS of relay transmission channels in frame 2 from the number of relay transmission channels and the amount of data of relayed signals. Furthermore, the relay station calculates the amount of data of relayed signals from the channel allocation information in frame 1 and MCS information. Therefore, according to the present embodiment, the relay station can determine the MCS of relayed signals without the base station reporting MCS information to the relay station in frame 2. Furthermore, the base station can also determine the MCS of the relayed signals in the same way as the relay station. Therefore, the present embodiment eliminates the necessity to reporting the MCS information about the relay transmission channels between the base station and the relay station, and can thereby further reduce the control information required for allocation of relay transmission channels.

Figure 19:
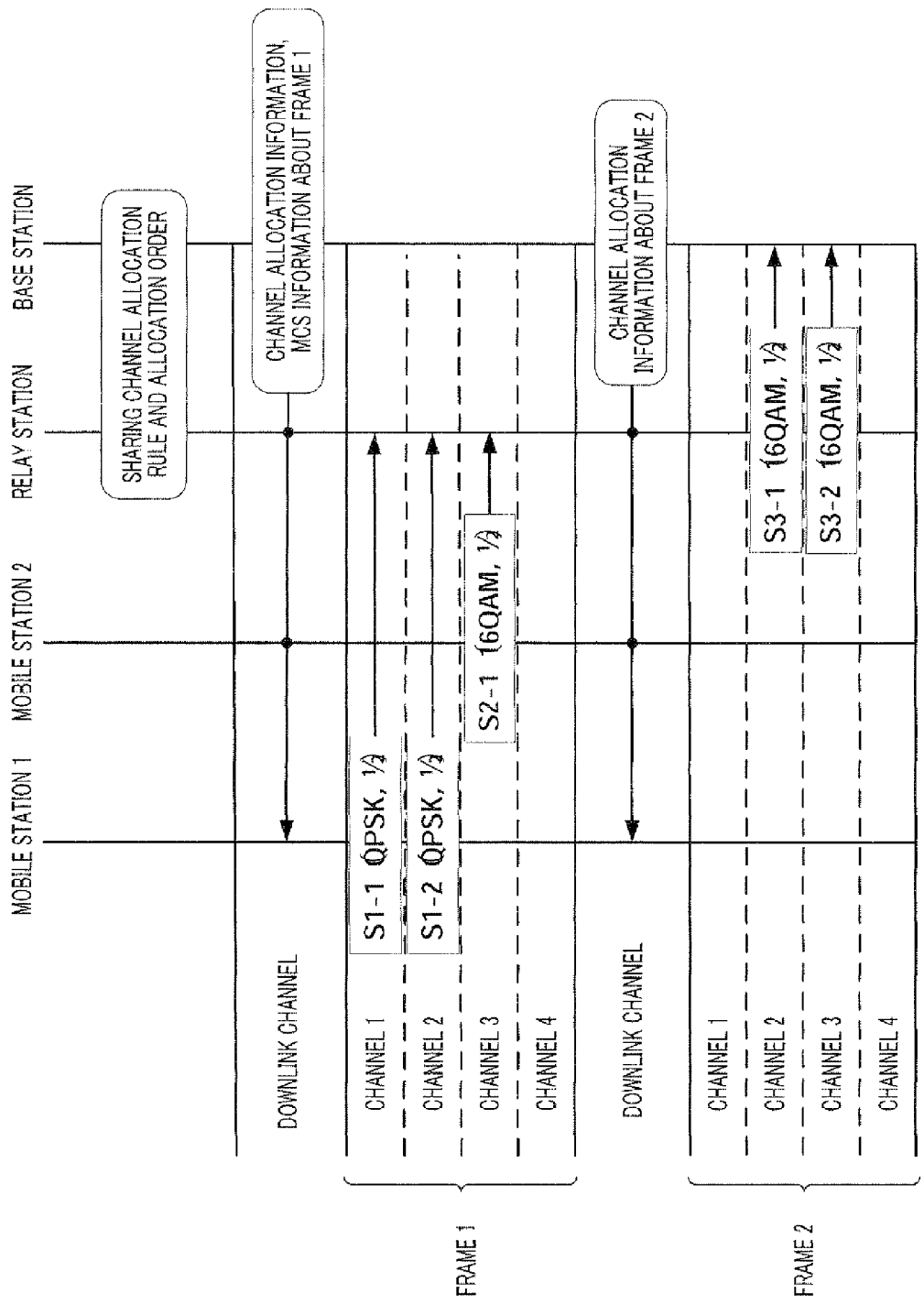
FIG. 19 is a sequence diagram according to Embodiment 5 of the present invention.

Next, FIG. 19 shows a sequence diagram according to the present embodiment.

First, prior to communication, the relay station and the base station share the above-described channel allocation rule and allocation order.

Next, the base station transmits the channel allocation information (FIG. 2A) and MCS information to mobile stations 1 and 2 and relay station in frame 1 through downlink channels.

Next, in frame 1 according to the channel allocation information (FIG. 2A), mobile station 1 transmits signal S1-1 of a modulation scheme: QPSK and coding rate: ½ using channel 1 and signal S1-2 of a modulation scheme: QPSK and coding rate: ½ using channel 2 out of uplink channels 1 to 4 to the relay station, and mobile station 2 transmits signal S2-1 of a modulation scheme: 16QAM and coding rate: ½ to the relay station using channel 3 out of uplink channels 1 to 4. The relay station then receives these signals.

Next, the base station transmits the channel allocation information in frame 2 (FIG. 3A) to mobile stations 1 and 2 and relay station through downlink channels. The relay station then sets channels 2 and 3 out of uplink channels 1 to 4 as the relay transmission channels as described above (FIG. 17B). Furthermore, the relay station determines the MCS of the relay transmission channels as described above.

Therefore, in frame 2, the relay station relays signal S3-1 of a modulation scheme: 16QAM and coding rate: ½ using channel 2 and signal S3-2 of a modulation scheme: 16QAM and coding rate: ½ using channel 3 out of uplink channels 1 to 4 to the base station. The base station then receives these signals.

Figure 20:
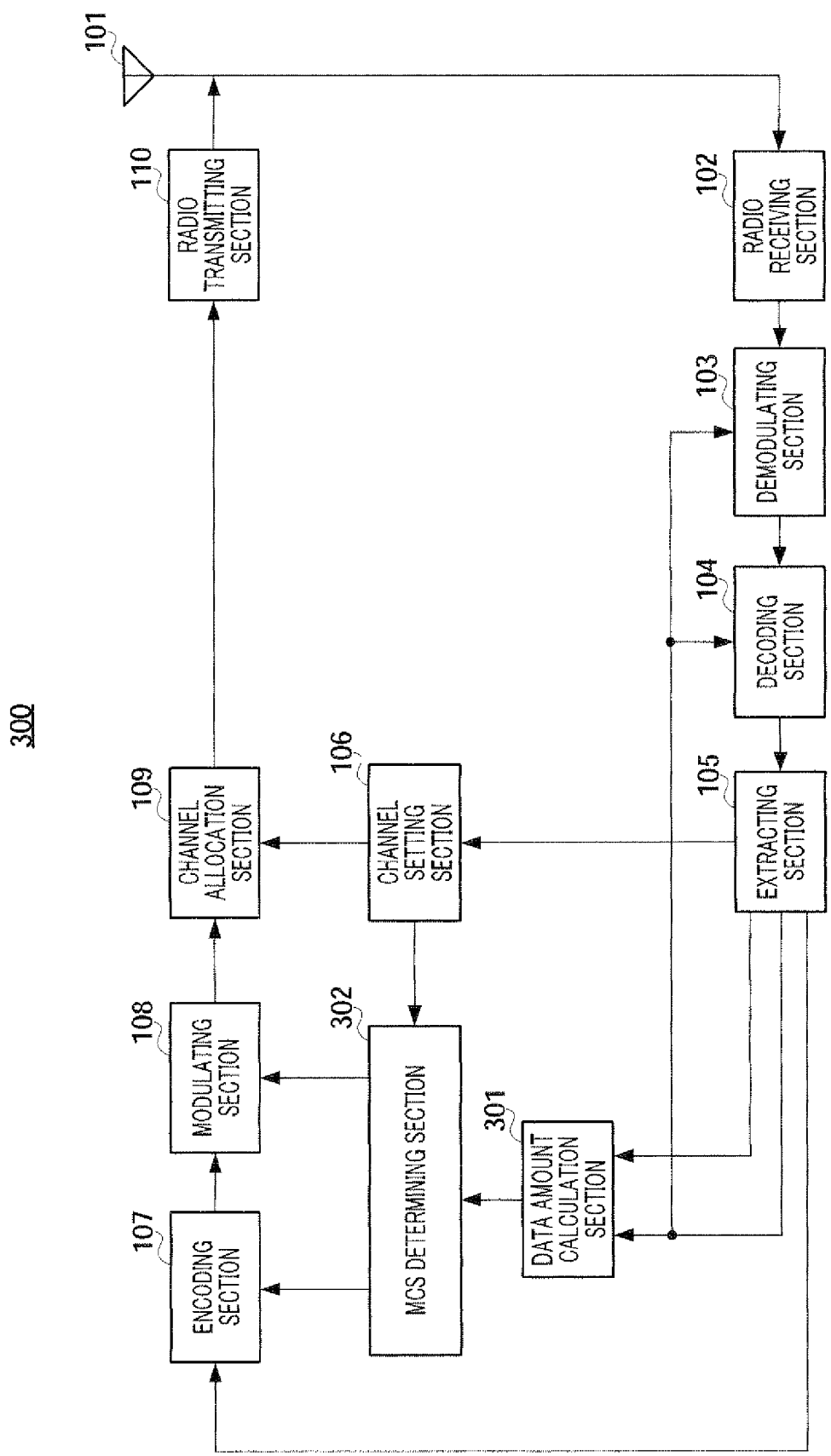
FIG. 20 is a block diagram showing a configuration of the relay station according to Embodiment 5 of the present invention.

Next, the configuration of the relay station according to the present embodiment will be explained. FIG. 20 shows a configuration of relay station 300 according to the present embodiment.

In relay station 300, radio receiving section 102 receives a signal from the mobile station, and channel allocation information and MCS information from the base station via antenna 101, performs radio processing such as down-conversion and outputs the processed signal to demodulating section 103.

Demodulating section 103 demodulates the signal from the mobile station, and the channel allocation information and MCS information from the base station, and outputs the demodulated signal and information to decoding section 104.

Decoding section 104 decodes the signal from the mobile station, and the channel allocation information and MCS information from the base station, and outputs the decoded signal and information to extracting section 105.

Extracting section 105 extracts the signal from the mobile station from the signal inputted from decoding section 104, outputs the extracted signal to encoding section 107, extracts the channel allocation information from the base station, outputs the extracted information to channel setting section 106 and data amount calculation section 301, extracts the MCS information from the base station and outputs the extracted MCS information to data amount calculation section 301, demodulating section 103 and decoding section 104. Demodulating section 103 and decoding section 104 demodulates and decodes the signal from the mobile station according to this MCS information.

Channel setting section 106 sets relay transmission channels based on the channel allocation result shown in the channel allocation information according to the channel allocation rule shared between relay station 300 and the base station as described above. Channel setting section 106 outputs the setting result of the relay transmission channels to channel allocation section 109 and outputs the set number of relay transmission channels to MCS determining section 302.

Data amount calculation section 301 calculates the amount of data of the relayed signal from the channel allocation information and MCS information as described above, and outputs the amount of data to MCS determining section 302.

MCS determining section 302 determines the MCS of the relayed signal from the amount of data of the relayed signal and the number of relay transmission channels as described above, and outputs the MCS information to encoding section 107 and modulating section 108.

Encoding section 107 re-encodes the signal from the mobile station according to the MCS information inputted from MCS determining section 302, and outputs the encoded signal to modulating section 108.

Modulating section 108 re-modulates the signal from the mobile station according to the MCS information inputted from MCS determining section 302 and outputs the modulated signal to channel allocation section 109.

Channel allocation section 109 allocates the modulated signal to one of the relay transmission channels according to the allocation order shared between relay station 300 and the base station, and outputs the allocated modulated signal to radio transmitting section 110.

Radio transmitting section 110 performs radio processing such as up-conversion to the modulated signal and relays the modulated signal from antenna 101 to the base station.

According to the present embodiment, the relay station may determine the MCS for a channel for which the MCS is specified from the base station out of the relay transmission channels, and may determine the MCS for the remaining channels for which the MCS is not specified, from the number of the remaining channels and the amount of data of the relayed signals using the remaining channels.

Embodiments of the present invention have been explained so far.

Cases have been explained in the above-described embodiments where the present invention is applied to uplinks, but the present invention can also be implemented with downlinks provided in the same way as described above. That is, the relay station may relay control signals such as channel allocation information and MCS information, and downlink data transmitted from the base station through downlink channels to the mobile stations in the same way as described above.

Frames 1, 2 and 3 in the above-described embodiments need not always be consecutive frames. That is, frame 2 needs only to be a frame that comes after frame 1 and frame 3 needs only to be a frame that comes after frame 2.

Moreover, with the embodiments, additional relay stations may be placed between the relay station and the base station or between the mobile station and the relay station. Furthermore, a signal from the mobile station may be received by the base station via a plurality of relay stations.

Furthermore, the base station according to the embodiments may be expressed as "Node B" and the mobile station may be expressed as "UE". Furthermore, the relay station according to the embodiments is referred to as "repeater," "simple base station," "cluster head," and so on.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-272131, filed on Oct. 3, 2006, including the specification, drawings and abstract, is incorporated herein by reference in its entirety.

INDUSTRIAL APPLICABILITY

The present invention is applicable to communication systems in which radio communication apparatuses such as mobile stations and base stations carry out radio transmission through relay stations, for example, multihop systems.

The invention claimed is:

1. A relay station comprising:
   a receiving section that receives a signal from a mobile station in a first frame;
   a setting section that sets a relay transmission channel in a second frame following the first frame, according to a rule shared between the relay station and a base station, based on allocation information on a receiving channel allocated by the base station to receive the signal; and
   a transmitting section that carries out relay transmission to the base station in the second frame using the set relay transmission channel,
   wherein, when a number of relay transmission channels in the second frame is smaller than a number of receiving channels in the first frame, the setting section sets another relay transmission channel in a third frame after the second frame according to the rule based on the allocation information on the receiving channel; and
   the transmitting section carries out relay transmission to the base station in the third frame using the set other relay transmission channel.

2. The relay station according to claim 1, wherein the setting section assumes the plurality of receiving channels in the first frame are candidate channels in the second frame and sets a channel other than a channel allocated by the base station to another relay station or a mobile station, out of the candidate channels in the second frame, as the relay transmission channel.

3. The relay station according to claim 1, wherein the setting section assumes the plurality of receiving channels in the first frame are candidate channels and sets a channel allocated by the base station to a mobile station that transmits a signal to another relay station in the second frame, out of the candidate channels, as the relay transmission channel.

4. The relay station according to claim 1, wherein the setting section sets the plurality of receiving channels in the first frame, and a channel allocated by the base station to the relay station in the second frame, as relay transmission channels.

5. The relay station according to claim 1, wherein the setting section assumes a plurality of continuous channels between a minimum numbered receiving channel and a maximum numbered receiving channel in the first frame are candidate channels, and sets a channel other than a channel allocated by the base station to other relay stations or a mobile station in the second frame out of the candidate channels, as the relay transmission channel.

6. The relay station according to claim 1, wherein the setting section assumes, on the basis of a minimum numbered receiving channel having a maximum period out of the plurality of the receiving channels in the first frame that a number N of channels in the first frame for the maximum period are candidate channels, and sets a channel other than a channel allocated by the base station to other relay stations or a mobile station in the second frame out of the candidate channels as the relay transmission channel, N being equal to the number of the receiving channels in the first frame.

7. The relay station according to claim 1 , wherein the setting section assumes a maximum number of channels for a predetermined period out of the plurality of receiving channels in the first frame are candidate channels, and sets a channel other than a channel allocated by the base station to another relay station or a mobile station in the second frame out of the candidate channels as the relay transmission channel.

8. The relay station according to claim 1, further comprising a determining section that determines a modulation scheme and a coding rate for the relay transmission channel based on the number of relay transmission channels in the second frame and an amount of relayed signals.

9. The relay station according to claim 1, further comprising a determining section that determines a modulation scheme and a coding rate for some channels among the relay transmission channels in the second frame according to a designation from the base station, and determines a modulation scheme and a coding rate for the remaining channels other than the some channels based on a number of the remaining channels and an amount of relayed signals using the remaining channels out of relayed signals.

10. A method for setting relay transmission channels used by a relay station that carries out relay transmission between a mobile station and a base station, comprising:
receiving a signal from the mobile station in a first frame; and
setting a relay transmission channel in a second frame following the first frame, according to a rule shared between the relay station and the base station, based on allocation information on a receiving channel allocated by the base station to receive the signal in the first frame;
wherein, when a number the relay transmission channels in the second frame is smaller than a number of receiving channels in the first frame, another relay transmission channel in a third frame after the second frame is set according to the rule based on the allocation information on the receiving channel, and a relay transmission to the base station is carried out in the third frame using the set other relay transmission channel.

* * * * *